March 7, 1944.  G. T. REICH  2,343,706
PROCESSING OF MATERIALS
Filed Feb. 23, 1940  2 Sheets-Sheet 1

Inventor:
Gustave T. Reich
By Potter, Pierce & Scheffler
Attorneys.

March 7, 1944.   G. T. REICH   2,343,706
PROCESSING OF MATERIALS
Filed Feb. 23, 1940   2 Sheets-Sheet 2
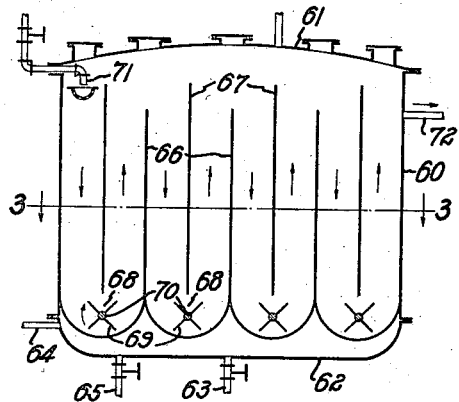
Fig.2.
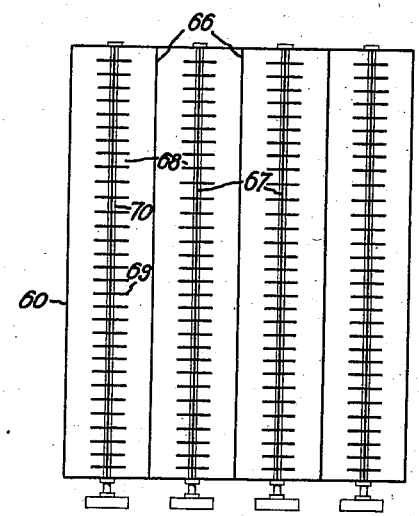
Fig.3.
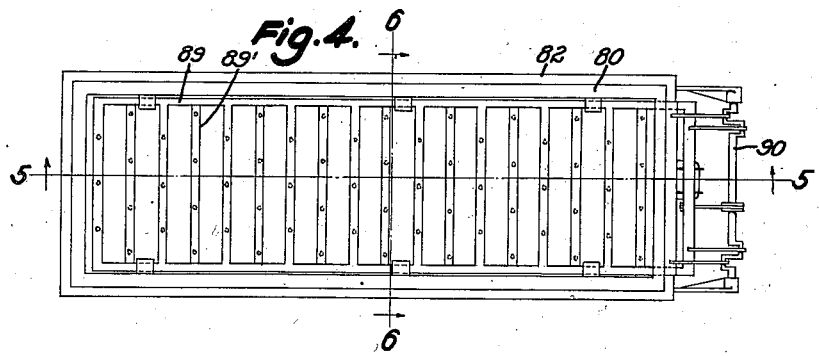
Fig.4.
Fig.5.   Fig.6.
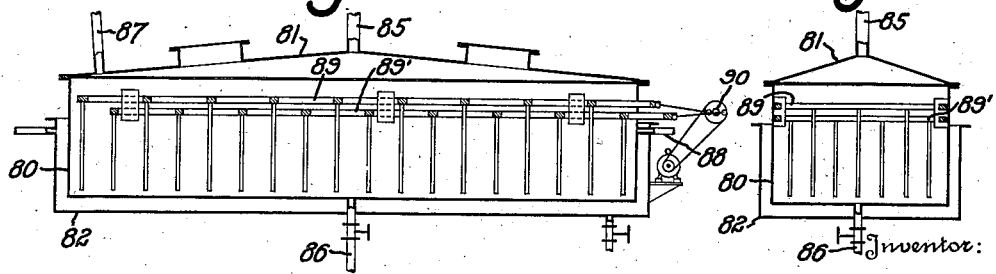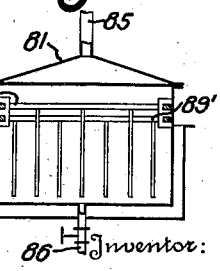
Inventor:
Gustave T. Reich
By Potter, Pierce & Scheffler
Attorneys.

Patented Mar. 7, 1944

2,343,706

UNITED STATES PATENT OFFICE 2,343,706

PROCESSING OF MATERIALS

Gustave T. Reich, Philadelphia, Pa.

Application February 23, 1940, Serial No. 320,479

15 Claims. (Cl. 195—17)

This invention relates to process and apparatus for the continuous processing of materials and especially for the continuous production from starch-containing materials, such as grains, of a liquid mixture containing fermentable sugars, technically known as wort. The invention is particularly directed to the provision of process and apparatus suitable for the low-cost production of power alcohol from starchy materials.

The general process of the manufacture of grain alcohol up to the fermentation consists of the following steps:

1. Releasing the starch from the grain kernel and liquefying the starch.
2. Producing a liquid malt extract, containing diastase and starch.
3. Processing the liquefied starch and malt extract at such a temperature and time that the diastase will react upon the starch and convert the latter into fermentable dextrose and maltose.
4. Cooling the wort to the fermentation temperature and the addition of the yeast.

It will be seen that two raw materials are utilized, cereals such as corn, rye, wheat and oats, and barley converted into malt. Cereals contain starch, while malt contains diastase and starch. The two ingredients are most effectively processed at a certain temperature, time and consistency. Starch can be liquefied from 160° F. to 300° F. While diastase is most active around 150–160° F. and up to 180° F., above this temperature its activity is decreased very rapidly. The reaction of the diastase upon the starch is called "saccharification," and the density of the liquid obtained depends upon the extractive matter. The yield of the extractive matter affects the operation efficiency and the ultimate use of the final product, alcohol. Some distillers sacrifice the yield in the extractive matter, claiming in this manner to produce a superior beverage alcohol. However, it is problematical whether a higher yield working at an elevated temperature will produce a lower grade product, provided conditions are properly regulated. However, for the production of power alcohol, the higher the extractive matter, the lower the manufacturing cost.

The present method of mashing and saccharifying cereals is too expensive and cumbersome for the production of low-cost power alcohol. A continuous process and compact equipment, reducing the capital investment, designed for the better utilization of steam, and reducing labor and building costs to a minimum are very desirable.

The object of the present invention is the provision of such a process and apparatus.

In order to provide a clearer picture of the distinctive features of the invention, a brief description of the present mode of processing grains under pressure in the manufacture of alcohol will be given.

Corn, rye, wheats or oats, after cleaning, are stored in bins from which they are weighed and ground. It is customary to take part of the malt required for saccharifying the starch with the cereal right at the beginning. The weighed, crushed malt and weighed, ground cereal, with the proper amount of water, are mixed in the grain cooker. This cooker is usually a cylindrical tank, built sufficiently strong, that the starch in the grain can be gelatinized under 65 to 100 pounds pressure. During the cooking, an agitator keeps the ground grain in suspension, and live steam is introduced under the above pressure through several valves until the grain is completely disintegrated and the starch gelatinized. When the batch is completed the excess steam is released, and as the mash reaches atmospheric pressure vacuum is applied and the batch is cooled to the setting temperature for saccharification, which is around 150°–160° F. The crushed malt required for saccharification is first mixed with hot water so as to produce a malt milk and added to the cooked and cooled cereal mash. After mixing and allowing the diastase to react for a certain length of time, the finished product passes through water coolers, and then to the fermenters.

This process is an entirely batch process. Malt and cereals are weighed in batches, cooked in batches, and saccharified in batches.

As applied to the production of wort, the process of the invention typically includes the following steps: pre-cooking the grain, cooking the grain, pre-mashing the malt, saccharifying the mash, and cooling the wort. Each of these steps is continuous. The cooking and saccharifying operations, in particular, are carried out in such a manner that the material being treated passes through all parts of the treating zone at a rate proportional to the rate of feed to the zone so that the time and conditions of treatment of each portion of the material are uniform. This uniformity is not an average uniformity due to mixing of undertreated and overtreated material, but is an absolute uniformity arising from the subjection of each portion of the material to the same treatment without any substantially intermingling of earlier-fed material with later-fed material in the zones of treatment.

A further feature of the invention is the carrying out of the cooking operation in a series of stages of successively increasing temperature and pressure. The cooked material is then flash-cooled in a corresponding succession of stages, the vapor removed at each stage being supplied to a preceding cooking stage. In this way, a very great increase in efficiency and a corresponding decrease in steam consumption is obtained.

For some purposes, particularly when there is a demand for a large amount of low pressure steam, it is advantageous to heat the material to be cooked to the maximum temperature in one continuous stage and to flash-cool the material to the desired final temperature in a series of stages of successively lowered temperature and pressure, the steam released at each stage being utilized in other steps of the process or in other processes. This method has the advantage of greatly increasing the disintegration of the material being cooked in the flash-cooling operations and of making it possible to convey the material from one cooking stage to the next by means of its own pressure, thus eliminating the use of pumps or the utilization of headroom to provide gravity flow.

The invention will be more particularly described with reference to the accompanying drawings in which:

Fig. 2 is a sectional elevation, and Fig. 3 is a sectional plan view on line 3—3 of Fig. 2, of a form of saccharifier embodying the principles of the invention;

Fig. 4 is a plan view, Fig. 5 is a section on line 5—5 of Fig. 4, and Fig. 6 is a section on line 6—6 of Fig. 4, of another form of saccharifier.

Figure 1:
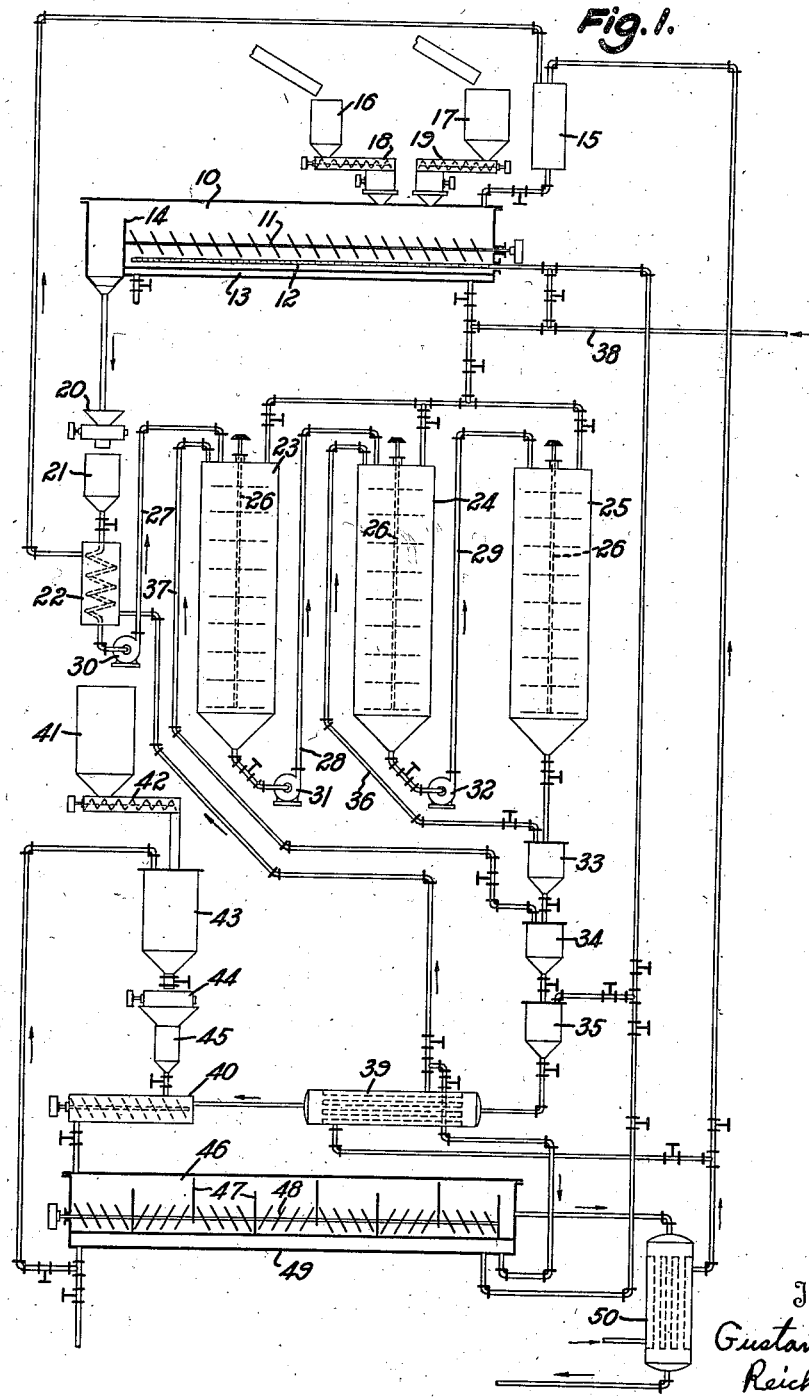
Fig. 1 is a semi-diagrammatic representation of a system of apparatus for the production of wort and the like in accordance with the principles of the invention.

In Fig. 1, 10 is a precooker, comprising a horizontal trough, provided with a stirrer 11, a live steam inlet 12, a jacket 13 and an overflow regulator 14. The precooker is connected with a water supply tank 15 and malt and grain feed bins 16 and 17, respectively, provided with continuous feeding devices 18 and 19. The overflow chamber of the precooker is connected with a grinder 20 which discharges into cooker feed tank 21 connected to the cooker through heat exchanger 22.

The cooker shown in the drawings comprises three units 23, 24, 25, but two units or more than three units may be used. Each cooker unit is provided with a stirrer 26. Pipes 27, 28, and 29 and pumps 30, 31 and 32 provide for the continuous feed of material serially through cooker units 23, 24 and 25 in succession. The discharge from cooker unit 25 passes successively through flash coolers 33, 34, 35. The vapor space of flash cooler 33 is connected to cooker unit 24 by pipe 36 and the vapor space of flash cooler 34 is connected to cooker unit 23 by pipe 37.

Cooker unit 25 is supplied with steam from high pressure steam line 38. Additional steam may also be supplied to cooker units 24 and 23 from this line.

Material from flash cooler 35 passes through cooler 39 to mixer 40. Malt from bin 41 is supplied to mixer 40 through feeder 42, premasher 43, grinder 44 and storage tank 45.

Mixer 40 feeds into saccharifier 46, which is provided with baffles 47, stirrer 48 and jacket 49. Heat exchanger 50 is provided in the outlet from saccharifier 46.

The following is an illustrative example of the application of the method of the invention to the production of wort in the apparatus of Fig. 1:

Corn, malt and water (heated to 170° F. by heat from exhaust steam and condenser water) are continuously fed into precooker 10, in the proportion of 1000 bushels of corn, 10 bushels of malt and 20,200 gallons of water. The mixture is heated to, and maintained at, 170° F. by the injection of live steam or by indirect heating or both. In passing through the precooker the mixture is stirred only sufficiently to prevent substantial segregation. The rate of flow through the precooker is determined by the rate of feed of the materials and the length of time the material remains in the precooker for a given rate of flow is determined by the size of the precooker and the position of the outlet. Since the mixture is only slowly stirred to prevent segregation, it passes through the precooker at a uniform rate determined by the rate of flow, each portion being subjected to the temperature of the precooker for the same length of time. For the batch described herein by way of example, the material may advantageously be subjected to a temperature of 170° F. in the precooker for about 30 minutes.

The warm, softened cereal may now pass through a degerminator, not shown, or pass directly into grinder 26. Owing to the precooking and subsequent grinding, which is preferably very fine, the gelatinization in the cooking operation is very rapid and efficient, the starch is readily liquefied, settling of the suspended matter is prevented and the yield of extractive matter is increased. From the grinder the liquid mass passes into feed tank 21. Instead of adding all the water to the grain in the precooker, a portion of it may be added after the grinding operation.

The mixture is continuously fed from the feed tank into the first cooker unit 23 through pump 30 and pipe 27 preferably by way of preheater 22 wherein its temperature may be raised to 185° F. or higher. In this unit the mash is raised to 235° F. at 8 pounds pressure by means of stream from flash cooler 34 wherein the cooked mash is dropped from 35 pounds pressure to 8 pounds pressure. The mash from cooker unit 23 is pumped continuously into cooker unit 24 where it is raised to 281° F. at 35 pounds pressure by steam from flash cooler 33, aided, if necessary, by a small amount of steam from the high pressure supply. The mash from cooker unit 24 is pumped continuously into cooker unit 25 where it is raised to 312° F. and 65 pounds pressure by steam from the high pressure steam supply.

The cooked mash flows continuously out of cooker unit 25, passing successively through flash coolers 33, 34, 35 and cooler 39. In flash cooler 33 the pressure is dropped 35 pounds by flashing into cooker unit 24. In flash cooler 34 the pressure is dropped to 8 pounds by flashing into cooker unit 23. In flash cooler 35 the pressure is dropped to 3 pounds or less, the steam from this cooler being used to heat precooker 10 or saccharifier 46 or both. In cooler 39 the mash is further cooled to about 155° F. by heat exchange with a stream of water, advantageously that which has already passed through cooler 50. The hot water from cooler 39 may be used to heat saccharifier 46 or it may be used to preheat the mash in heat exchanger 22 and then conveyed to water tank 15 for use in making up the grain mix in the precooker. A fourth flash tank operating under vacuum may be used.

The pressure ranges in the various cooking stages and corresponding flash cooling stages are merely illustrative and may, of course, be varied for different materials or different conditions. It will be noted that although the flow of grain mash through the cooker units and flash coolers is continuous, the pressure is increased stepwise in the cookers and correspondingly decreased stepwise in the coolers.

The cooker units may be uniform in size or they may be of different sizes. At a given rate of feed the length of time the material is exposed to each cooking stage will depend upon the volume of material in the cooker unit for that stage. Under the conditions described herein, the time required to complete the cooking is about one hour, although by grinding the grain to a size approaching colloidal dimensions the cooking may be completed in about one-half hour.

The cookers are preferably provided with slowly moving agitators which merely serve to prevent any substantial settling of the suspended matter and the material flows in a uniform stream downward through the cookers without any substantial vertical mixing by the agitators. By pumping the ground cereal always to the top of the cookers where it is brought into contact with live steam of higher pressure, and by supplying a very finely ground grain, preferably finer than hitherto used in the manufacture of alcohol, it has been found that a more rapid liquefaction of the starch is effected and relatively little settling occurs. The cookers may be provided with heating coils or jackets if desirable.

The hot mash after cooling to about 155° F. is mixed in mixer 46 with malt which has been premashed and finely ground in 44 and 45, using about 90 bushels of malt and 1800 gallons of water to 1000 bushels of corn. The mixture of malt and grain mash is continuously fed into saccharifier 46.

The volume capacity of the saccharifier is such that the time required for a given portion of the mix to pass through it at the predetermined rate of feed is sufficient to complete the saccharification, in general one-half to one hour at 150–160° F.

The baffles 47, alternately projecting from the top and bottom of the saccharifier, cause the mixture to follow an up and down path through the saccharifier. The stirrer 48 is designed merely to prevent undue sedimentation without excessive mixing so that the time of passage of each portion of the mixture through the saccharifier is substantially the same. Preferably all the solids entering the saccharifier are at least as fine as flour.

If the saccharifier is well insulated, there will be very little loss of heat. It is advantageous, however, to provide a jacket 49 which may be supplied with hot water from mash cooler 39, or with steam from flash cooler 35. The hot water leaving the jacket is at just the right temperature for preparing the malt mash in tank 43. The wort leaving the saccharifier is cooled to about 80° F. in cooler 50 and then passes to the fermenters.

As will be seen, the process is completely continuous and by counter-current circulation of exhaust steam and water between the various operations a very complete utilization of the steam supply is effected, reducing the steam consumption by almost 75% from the prior art processes.

Although the process has been described, by way of example, with particular reference to the production of wort for fermenting into alcohol, the principles of the invention may also be applied to other industrial processing operations, such as the manufacture of corn sugar.

The principles of the invention are not limited to the particular form of apparatus shown in Fig. 1 of the drawings. To illustrate the application of these principles to the saccharification operation, two other forms of saccharifiers are shown in the drawings.

Figs. 2 and 3 show a vertical flow saccharifier. This comprises a rectangular tank 60 having a cover 61 and a jacketed bottom 62, provided with inlet 63, outlet 64 and drain 65. The tank is divided into a plurality of compartments by vertical partitions 66 projecting from the bottom. Each compartment is divided by partitions 67 into two vertical portions communicating at the bottom. Partitions 67 project at their upper ends above the tops of partitions 66 and thus provide a plurality of communicating vertical channels through the saccharifier. At the bottom of each compartment, below the lower end of partitions 67, is an agitator 68, preferably rotating in the direction indicated by the arrow and comprising a plurality of short, straight blades 69, which may be slightly turned, mounted on shaft 70. These agitators provide a restricted stirring zone at the lowest point of each compartment which serves to prevent the solid material from settling without unduly agitating the mash.

The mash of grain and malt is introduced along the top of the first compartment through distributor 71. It flows uniformly and continuously down and up through each compartment in succession and the saccharified wort is withdrawn at outlet 72, preferably extending the full width of the tank.

Figs. 4, 5 and 6 show a horizontal, straight flow saccharifier, comprising a rectangular tank 80, with cover 81 and jacket 82 having an inlet 83 and outlet 84. 85 is a vapor line and 86 is a drain. The mash is introduced continuously at inlet 87 and the saccharified wort flows out through outlet 88.

For the purpose of preventing settling of solids without undue mixing of the material flowing through the saccharifier, it is provided with two sets of agitators 89, 89' which are oscillated back and forth counter to each other by crank-shaft 90.

I claim:

1. A method of processing materials which comprises passing a fluid aqueous mixture of the material to be processed continuously through a plurality of zones, maintaining in each of said zones a uniform condition of temperature and pressure increasing from zone to zone in the direction of flow of the material, and thereafter evaporatively cooling said material by passing it through a plurality of zones maintained at successively decreasing pressures, and supplying heat to said first-mentioned zones by passing vapor from said second-mentioned zones directly into contact with the material in said first-mentioned zones.

2. A method of processing materials which comprises passing a fluid aqueous mixture of the material to be processed continuously through a plurality of zones, maintaining in each of said zones a uniform condition of temperature and pressure increasing from zone to zone in the direction of flow of the material, and thereafter evaporatively cooling said material by passing it through a plurality of zones maintained at successively decreasing pressures, and supplying heat to said first-mentioned zones by passing vapor from said second-mentioned zones to said first-mentioned zones which are maintained at lower pressure than the pressure existing in the zone from which the vapor is derived.

3. In the production of wort the method which comprises passing a fluid aqueous suspension of starch-containing material continuously through a plurality of zones, maintaining in each of said zones a uniform condition of temperature and pressure increasing from zone to zone in the direction of flow of the material, and thereafter evaporatively cooling said material by passing it through a plurality of zones maintained at successively decreasing pressures, and supplying heat to said first-mentioned zones by passing vapor from said second-mentioned zones directly into contact with the material in said first-mentioned zones.

4. In the production of wort the method which comprises passing a fluid aqueous suspension of starch-containing material continuously through a plurality of zones, maintaining in each of said zones a uniform condition of temperature and pressure increasing from zone to zone in the direction of flow of the material, and thereafter evaporatively cooling said material by passing it through a plurality of zones maintained at successively decreasing pressures, and supplying heat to said first-mentioned zones by passing vapor from said second-mentioned zones to said first-mentioned zones which are maintained at lower pressure than the pressure existing in the zone from which the vapor is derived.

5. In the production of wort the method which comprises passing a fluid aqueous suspension of starch-containing material continuously through a plurality of zones, maintaining in each of said zones a uniform condition of temperature and pressure increasing from zone to zone in the direction of flow of the material, the rate of flow of said material through said zones being regulated to effect substantially complete gelatinization of the starch during the passage of the material therethrough, and thereafter cooling the material at least in part by direct evaporation of water therefrom.

6. In the production of wort the method which comprises passing a fluid aqueous suspension of starch-containing material continuously through a plurality of zones, maintaining in each of said zones a uniform condition of temperature and pressure increasing from zone to zone in the direction of flow of the material, the rate of flow of said material through said zones being regulated to effect substantially complete gelatinization of the starch during the passage of the material therethrough, thereafter cooling the material at least in part by direct evaporation of water therefrom, and passing a mixture of the material and a starch-saccharifying substance in a continuous stream through a heating zone maintained at saccharifying temperature without substantial agitation.

7. In apparatus for the continuous processing materials, a plurality of pressure cookers serially connected for the passage of mash successively therethrough, a plurality of vapor release coolers serially connected for the passage of mash from the last of said cookers successively through said coolers, conduit means connecting the vapor space of each of said coolers except the one maintained under lowest pressure with one of said cookers maintained under a pressure lower than the cooler connected thereto, and means for supplying pressure steam from a source thereof to the cooker operating under highest pressure.

8. In apparatus for the continous processing of materials, a plurality of pressure cookers serially connected for the passage of mash successively therethrough, a plurality of vapor release coolers serially connected for the passage of mash from the last of said cookers successively through said coolers, conduit means connecting the vapor space of each of said coolers except the one maintained under lowest pressure with one of said cookers maintained under a pressure lower than the cooler connected thereto, means for supplying pressure steam from a source thereof to the cooker operating under highest pressure, and valve means in the connections between each of said cookers, between each of said coolers and between said coolers and said cookers for maintaining predetermined differential pressures in said cookers and coolers.

9. In apparatus for the continuous processing of materials, a plurality of pressure cookers serially connected for the passage of mash successively therethrough, a plurality of vapor release coolers serially connected for the passage of mash from the last of said cookers successively through said coolers, conduit means connecting the vapor space of each of said coolers except the one maintained under lowest pressure with one of said cookers maintained under a pressure lower than the cooler connected thereto, means for supplying pressure steam from a source thereof to the cooker operating under highest pressure, valve means in the connections between each of said cookers, between each of said coolers and between said coolers and said cookers for maintaining predetermined differential pressures in said cookers and coolers, a mash pre-cooker adapted to be maintained under lower pressure than any of said cookers, means for continuously transferring mash from said pre-cooker to the cooker maintained under lowest pressure, and means connecting the vapor space of the cooler maintained under lowest pressure with said pre-cooker.

10. In apparatus for the continuous processing of materials, a plurality of pressure cookers serially connected for the passage of mash successively therethrough, a plurality of vapor release coolers serially connected for the passage of mash from the last of said cookers successively through said coolers, conduit means connecting the vapor space of each of said coolers except the one maintained under lowest pressure with one of said cookers maintained under a pressure lower than the cooler connected thereto, means for supplying pressure steam from a source thereof to the cooker operating under highest pressure, valve means in the connections between each of said cookers, between each of said coolers and between said coolers and said cookers for maintaining predetermined differential pressures in said cookers and coolers, and agitator means in said cookers adapted to maintain solids in suspension without substantial intermingling of the material passing through said cookers.

11. In apparatus for the continuous processing of materials, a plurality of pressure cookers serially connected for the passage of mash successively therethrough, a plurality of vapor release coolers serially connected for the passage of mash from the last of said cookers successively through said coolers, conduit means connecting the vapor space of each of said coolers except the one maintained under lowest pressure with one of said cookers maintained under a pressure lower than the cooler connected thereto, means for supplying pressure steam from a source thereof to the cooker operating under highest pressure, valve means in the connections between each of said cookers, between each of said coolers and between said coolers and said cookers for maintaining predetermined differential pressures in said cookers and coolers, a saccharifier comprising a container providing an extended path for the flow of mash therethrough, means for continuously transferring mash from the last of said coolers to said saccharifier, and means connecting the vapor space of the last of said coolers with said saccharifier.

12. In apparatus for the continuous processing of materials, a plurality of pressure cookers serially connected for the passage of mash successively therethrough, a plurality of vapor release coolers serially connected for the passage of mash from the last of said cookers successively through said coolers, conduit means connecting the vapor space of each of said coolers except the one maintained under lowest pressure with one of said cookers maintained under a pressure lower than the cooler connected thereto, means for supplying pressure steam from a source thereof to the cooker operating under highest pressure, valve means in the connections between each of said cookers, between each of said coolers and between said coolers and said cookers for maintaining predetermined differential pressures in said cookers and coolers, a saccharifier comprising a container providing an extended path for the flow of mash therethrough, means for continuously transferring mash from the last of said coolers to said saccharifier, heat transfer means for cooling the mash between said cooler and said saccharifier, and means for supplying at least a portion of the heat absorbed from said mash to said saccharifier.

13. In the production of wort, the method which comprises heating a starch-containing material in aqueous suspension at approximately atmospheric pressure until the material is softened, grinding the softened material to a fine state of subdivision to produce a fluid aqueous suspension of starch-containing material, passing said material continuously through a plurality of heating zones under superatmospheric pressure, maintaining in each of said zones a uniform condition of temperature and pressure increasing from zone to zone in the direction of flow of the material, the rate of flow of the material through said zones being regulated to effect substantially complete gelatinization of the starch during the passage of the material therethrough, and thereafter passing a mixture of the material and a starch-saccharifying substance in a continuous stream through a heating zone maintained at saccharifying temperature without substantial agitation.

14. In the production of wort, the method which comprises heating a starch-containing material in aqueous suspension at approximately atmospheric pressure until the material is softened, grinding the softened material to a fine state of subdivision to produce a fluid aqueous suspension of starch-containing material, passing said material continuously through a plurality of heating zones under super-atmospheric pressure, maintaining in each of said zones a uniform condition of temperature and pressure increasing from zone to zone in the direction of flow of the material, the rate of flow of the material through said zones being regulated to effect substantially complete gelatinization of the starch during the passage of the material therethrough, mixing finely ground malt with said material, and passing the mixture in a continuous stream through a heating zone maintained at saccharifying temperature without substantial agitation.

15. In the production of wort the method which comprises passing an aqueous suspension of a starch-containing material continuously through a heating zone at approximately atmospheric pressure until the material is softened, grinding the softened material to a fine state of subdivision to produce a fluid aqueous suspension of starch-containing material, passing the suspension continuously through a heating zone under superatmospheric pressure at a rate of flow regulated with respect to the temperature in said zone to effect substantially complete gelatinization of the starch and thereafter passing a mixture of the material and a starch-saccharifying substance in a continuous stream through a heating zone maintained at saccharifying temperature.

GUSTAVE T. REICH.